United States Patent
Barrenechea

(10) Patent No.: US 6,231,765 B1
(45) Date of Patent: May 15, 2001

(54) PROCESS FOR MAKING POLYMERIC COMPLEX FROM RESIDUAL OR BY-PRODUCT EFFLUENTS FROM DISTILLERIES

(76) Inventor: Luis Perez Barrenechea, Calle Boyaca, Res. El Rosal PH-2, Caracas (VE)

( * ) Notice: Subject to any disclaimer, the term of this patent is extended or adjusted under 35 U.S.C. 154(b) by 0 days.

(21) Appl. No.: 09/339,106

(22) Filed: Jun. 24, 1999

(30) Foreign Application Priority Data

Jun. 24, 1998 (CO) .................................... 98-035895

(51) Int. Cl.⁷ .................. C05F 11/08; C02F 3/00; C12F 7/06
(52) U.S. Cl. ................... 210/606; 71/10; 71/26; 210/607; 210/609; 210/696; 435/161; 435/162; 435/262; 435/276
(58) Field of Search ..................... 435/161, 162, 435/262, 276; 71/10, 26; 210/609, 696, 607, 606

(56) References Cited

U.S. PATENT DOCUMENTS

| | | | |
|---|---|---|---|
| 4,560,659 | * 12/1985 | Asturias | 435/162 |
| 4,812,410 | * 3/1989 | Lawford | 435/161 |
| 4,822,737 | * 4/1989 | Saida | 435/162 |
| 4,876,196 | * 10/1989 | Salzbrunn et al. | 435/161 |
| 5,531,896 | * 7/1996 | Tambo et al. | 210/605 |
| 5,846,425 | * 12/1998 | Whiteman | 210/606 |
| 5,955,350 | * 9/1999 | Soni et al. | 435/264 |

\* cited by examiner

Primary Examiner—Herbert J. Lilling
(74) Attorney, Agent, or Firm—Dennison, Scheiner, Schultz & Wakeman

(57) ABSTRACT

A process for obtaining a polymeric complex from a by-product effluent obtained in a process for manufacturing alcohol by distilling a fermented aqueous sugar solution containing yeast. After distilling alcohol from the effluent a chemical or biological flocculant is added to the effluent to form a homogeneous mixture, which is heated to a temperature of at least about 80° C. Yeast is removed from the heated mixture by a first decantation, then insoluble solids and muds are removed by a second decantation. The mixture is then concentrated by partially evaporating water therefrom to obtain an aqueous solution of the polymeric complex.

14 Claims, No Drawings

PROCESS FOR MAKING POLYMERIC COMPLEX FROM RESIDUAL OR BY-PRODUCT EFFLUENTS FROM DISTILLERIES

FIELD OF THE INVENTION

This invention concerns a process for obtaining water-reducer, fluidizer, dispersant, tensio-active, adhesive and agglutinant agents from residual or by-product effluents which are produced by the result from distillation of concentrates used in alcohol manufacturing.

BACKGROUND OF THE INVENTION

The most commonly used process for industrial manufacturing of alcohol at distilleries comprises the following general steps:

Admission and treatment (clearing, water dilution and sulphuric acid addition) of molasses from sugar cane processing plants.

A fermenting step wherein the yeast is added to the diluted solution in order to ferment the sugars, as well as sulphuric acid to lower the pH of the diluted solution to about 3.7–4.5.

Fermentation produces alcohols, particularly ethanol and non-fermented products.

In alcohol distillation, approximately a 12 liters of residue per liter of alcohol is produced. A medium-sized distillery produces 50,000 liters of alcohol a day which is equivalent to 600,000 liters of residual effluents. This residue is highly pollutant due to its high oxygen chemical requirements (OCR) and oxygen biological requirements (OBR).

Its qualitative composition is as follows:

Water,
Wornactive-out yeast remainders,
Non-fermented products,
Other organic products, ketones, medium or high molecular weight unmatched alcohols, which were eliminated during production due to toxicity.
Products joined to the sugar or starch from the beginning of the process, as liquid compounds in the primary product (molasses or beetroot, barley, potato honeys etc.) in the form of non fermentable juices (sugars) which are incorporated into the main raw material in order to separate them later from the alcohols obtained.
Sulphates and other sulphur compounds from the sulphuric acid reaction that were added for product clearing and pH control.
Various cations either from the original plant or added as a part of the distillation process such as K,Na,Mg,Ca,Fe, etc.

These effluents ferment almost spontaneously and produce very unpleasant sulphurous odors and due to their OCR and OBR are highly pollutant in their capacity for taking oxygen from the environment, affecting flora and fauna. A medium-sized distillery as aforementioned, which produces 50,000 liters of alcohol a day has a contamination level equal to a city of 500,000 inhabitants.

At certain sites, where the distillery is located near plantations, residuals are used to irrigate these plantations.

Nevertheless, this use is not considered appropriate due to the disagreeable odor which, they emit and high transport costs. The most common method for eliminating these residuals consists of uncontrolled disposal into rivers, seas and swamps causing severe environmental damage.

SUMMARY OF THE INVENTION

The residuals in their aqueous state and unconcentrated constitute a relatively large percentage (4%–15% in weight) in products which are polymers forming a polymeric complex, which comprises polysaccharide chains, saponin or sapogenin chains, phenolic and dextran group compounds as well as their salts.

The main aim of the invention focuses on two objectives as follows:

1) to eliminate contaminant products;
2) to extract from them useful products which, are to be utilized in different industrial processes and which can also be marketed or re-used.

In order to do this, residuals are treated to achieve the following purposes:

A large volume of water to be re-used at the distillery;
Products designed for industrial application derived from the different polymers utilizing their water-reducer or fluidizer, tensio-active, dispersant, adhesive and binding features.

The balance varies from one distillery to other, concerning to the quantities and composition of raw materials being utilized, but it is near to:

82% industrial water;
14% dispersant, tenso-active, adhesive and industrial agglutinant agents, as an active component;
4% precipitates.

A part of the invention process concentrates the effluent and eliminates water-excess leaving up to 14% water which together with the 14% of active material aforementioned as dispersant, tensio-active, adhesive and agglutinant agents make an equal parts solution, that is, a 50% solution.

The active component of the water-reducer, fluidizer, dispersant, tensio-active, adhesive and agglutinant agents is a certain polymeric complex having a molecular weight ranging from 700 to 150,000 gr/mol. Its structure is not well known.

Generally, it has adhesive, dispersant and modifying surface tension properties in liquids and from them their main applications derived.

Due to its adhesive properties such polymeric complex can be used in making ceramic and refractory products, in soil stabilization, in light aggregate manufacturing for civil construction, in adhesive manufacturing and other applications.

Additionally, this polymeric complex can be used as water-reducer, fluidizer, dispersant and water-soluble anionic tensio-active agent and in this case it can be used in making dyes, insecticides, cement and concrete additives, in making moulded ceramic pieces, for stabilizing asphaltic and oil-water emulsions, micro-nutrient products for agriculture, cleaning products, industrial water treatment, in making batteries, in making dyes for photographic paper as well as in the tanning industry and crystal growing inhibitors.

Usually, similar dispersants and tensio-active agents are obtained simultaneously with the cellulose after treatment of wood using a bisulphite process. The aforementioned products obtained from such a process entail certain drawbacks as for example:

Many basic operations (milling, heating and separation) need to be carry out before attaining the lye containing dispersants, tensio-actives and agglutinants, which not only increases the cost of the whole process but also determines a performance reduction due to the numerous steps to be carried out.
The lack of homogeneousness of dispersants, tensio-actives and agglutinants depends on the nature of the wood type, which at times may be very heterogeneous and creates serious problems in formulation adjustments.

Now it has been found that it is possible to obtain water-reducers and fluidizers, dispersants, tensoactives and agglutinants by using a process which not only surpasses the above mentioned shortcomings related to the usual methods used to obtain these agents, but which also solves environmental problems associated with the uncontrolled discharge of the residual effluents into water courses, which is of great benefit to industry. In addition, this provides the advantageous reusage of a polluting sub-product generated in manufacturing alcohol through fermenting concentrates.

By applying the process of this invention, the contamination from distilleries is prevented, which helps them to comply with the environmental standards actually in force, wherein a main objective is stated as the recovery of any type of resources present in residues.

Another benefit, which arises from this process, is to make the distillery more competitive by gaining additional economic resources in place of having to pay for destroying such residues.

DETAILED DESCRIPTION OF THE INVENTION

The process is initiated by separating precipitates which are obtained by introducing the effluent which is at a minimum temperature of 80° C. into a designed tank wherein settling occurs.

Effluent volume determines tank size. Also, precipitate extraction can be carried out using nozzle type centrifugation machines or by other means.

After extracting the precipitates, the liquid effluent having an average solid concentration degree of up to 16% (between active matter and non-settled insoluble matter) is sent to a concentration plant. The effluent is heated up to 80° C. at the concentration plant inlet.

Concentration can be carried out in one or two steps, according to the usage to be given to the final product.

When the effluent is submitted to only a one step concentration, a concentration plant is used which receives effluent at a concentration from 4% to 16% weight/weight and delivers it at a concentration from 45% to 52% weight/weight. Insoluble solids contained in the effluent prior to concentration at a level of 2%, if not eliminated and remain during the concentration process may reach a 12% concentration, weight/weight in the concentrated effluent.

Depending on the type of raw material, which the distillery uses, and the type of concentrator and with a view to water-reducers or fluidizers, dispersants, tensoactives and agglutinants, a 3% rate of polymeric complex can be produced as gels and/or colloids.

These high insoluble content concentrations are sent to those industrial application fields wherein such insoluble matter does not show rejection problems as for example, agglomerated wood panel manufacturing, dispersant fluidizers in carrying limestone through pipe lines.

When concentration is carried out in two steps, the first step concentrates the effluent up to a concentration which can range between 32% and 45% weight/weight and in a concentrator chamber at this first step, this is carried out at a 60° C. temperature if a change of the dominant cation is desired. For this purpose, in the above mentioned concentration chamber, a compound is dosed which reacts with the effluent and exchanges its cation with the effluent, producing a change in the pH level of the effluent or polymeric complex. If the pH value reaches up to 9.0, colloids or gels, if any are present, re-dissolve and the risk of fermentation is reduced.

At this stage, the effluent volume has been reduced to approximately a quarter of its prior volume, as water condensates or as water, which corresponds to 750 liters per 1000 liters of processed effluent.

The semi-concentrated effluent is submitted to a settling process which lasts from 8 to 24 hours (depending on the settling tank volume) in order to complete all chemical reactions and flocculations through naturally occurring processes or through chemical or biological methods. Later, a process of eliminating insoluble matter and precipitates which were produced during the evaporating and settling process is carried out, as described above.

During the settling process and if the pH has not been previously increased, it is possible to add certain compounds, particularly enzymes which react with the polymeric complex which is in a gel or colloid state, and which convert it back to a dissolved becoming solid state.

The settled effluent or polymeric complex, or the phase containing the active compound is sent to a centrifugating clearing station wherein suspended solids are separated. The effluent leaves this clearing process or process for eliminating insoluble matter with a non-diluted solid content of about 0.1% and at a temperature of around 30° C.

Extracted muds, which are supposed to be at around 2% or 3% of the initial effluent volume, are extracted from the centrifuge pushed by a water flow in order to regulate its humidity up to a 25% range. Cleared effluent is passed through a heat exchanger and the temperature is increased to 60° C. taking it to a second concentration step wherein it is submitted to a concentration of around 52% weight/weight. It can also be concentrated by other means provided that the temperature is below 92° C., except when it is necessary to obtain the final product as a gel. In such a case, the concentration temperature must be above 92° C.

The polymeric complex thus obtained and free from insoluble matter represents a percentage of around a 14% of the initial effluent, is an excellent water-reducer or fluidizer, dispersant, tensio-active, adhesive and agluttinant product and is sent to those industries which need this product well cleared, that is, concrete and mortar additive, agrochemical fungicide, pesticide, ceramic and refractory, dye and paint industries, as well as other applications.

In the case when a gel-free or colloid-free product is required, it is necessary to take extreme care in controlling temperature and vacuum. For a good development process, the temperature cannot rise above 92° C., the most advisable temperature ranging from 22 to 84° C. Depression should be, according to the process point, between $2.5 \times 10^4$ Pascal to $9 \times 10^4$ Pascal (Pa).

Concentration stations can use any of the existing concentration systems as whether evaporation systems or another type, provided that they have temperature and vacuum control systems in order to keep the aforementioned parameters. Another way to separate the active matter from the excess water is to initiate using flocculants, which help in phase separation, wherein one of the phases contains the excess water and the other phase contains the precipitate having the active principle. Flocculants can be chemical or biological.

Changing the dominant cation is achieved by ionic exchange during concentration at any of its steps.

Clearing or separation of insoluble matter is carried out by settling or through centrifugation or using both techniques in the same process and according to the clearing degree required. Although we have described concentration in two steps wherein clearing is carried out in the stage from the first step to the second step, in practice, it is possible to achieve clearing through different methods as follows:

To clear before introducing the effluent into the concentrator, having the effluent at a concentration level from 4% to 15% using a settling or clearing tank and introducing additives such as sodium hydroxide, phosphoric acid and other compounds which may have the same effect in order to precipitate sulphates and other insoluble matter. At the end of the process, it is possible to obtain less than 2.5% of insoluble matter.

The settling tank can be in-line with the process and consequently it is important to adequately design the capacity and shape of the tank so that effluent residing time is precise and settling of insoluble matter occurs.

The settling tank can be separated from the process and in that case several tanks are required, so that when some of them are settling, others containing the settled effluent are sending the liquid to the concentrator;

Clearing by way of disc type centrifuge machines, when the effluent has a concentration of between 32% and 45%, that is, between the first and second clearing steps. Thus, 0.1% of insoluble matter is obtained at the centrifuge machine outlet.

Clearing the effluent after concentrating and when this effluent has a concentration of between 45% and 52%, and using gravity-tanks. For settling, these tanks are constructed with a tapered bottom as well as with sample takers at several heights in order to continuously check the insoluble matter concentration and the settling state. Using this type of clearing it is possible to obtain a percentage of insoluble matter less than 1.5 according to settling time. This clearing method requires many tanks of great volumes and consequently it is not recommended.

Carrying out clearing by using (both of the above-described methods) in the same process.

The quality of the effluent should determine what type of separation is to be used. Precipitates are measured through centrifugation using a lab centrifuge and an adequate graded test tube. In practice and for concentrations over 45%, the effluent is dissolved in water up to 50% by weight and centrifuged at 3000 rpm for 5 minutes, wherein the insoluble content settles at the bottom of test tube and this is multiplied by two to compensate for the aforementioned dissolving effect. For concentrations below 45%, precipitates are centrifuged without dissolving.

Insoluble matter analysis also indicates the existence or not of portions of polymeric complex, shaped as gel and/or colloid. To convert these gels or colloids to their previous polymeric complex state as dissolved solids, acidity is raised to a pH of about 9 or suitable enzymes are added at a suitable rate for at least 15 minutes and heated at 50° C. at the appropriate site of the plant.

Using the effluent, which has been concentrated and cleared or not, such, obtained through the above disclosed processes such as settling, centrifugation, concentration or any other procedure of phase separation, i.e., in a liquid state, as water reducer or fluidizer, dispersant, tensio-active, adhesive or agglutinant, it is necessary to have a suitable installation for handling and storage of great volumes which is expensive but feasible when dealing with transport over medium or short distances. When necessary to transport it over long distances or to store and distribute in small quantities it is better to convert the liquid into powder and pack in bags.

For this purpose, the concentrated effluent is submitted to a drying operation and dispersants, tensio-actives, agglutinants and adhesives are obtained in a powder form with a residual humidity of below 5% in weight.

Drying is carried out mainly at Drying Plants through spraying or powdering and through hot air at temperatures between 300° C. and 900° C.

Since the powder obtained is hygroscopic, handling requires necessary precautions in order to avoid air contact and it must be packed into bags which have suitable seals.

The process outlined by this invention offers numerous advantages when compared to the current existing processes since:

it is based on a by-product, which has not been used so far, and it represents a serious environmental threat;

it is a very simple process which requires few steps and which consequently reduces cost and increases performance of the whole process;

it is a modular process which makes it possible to obtain polymeric complex either in an aqueous solution at the desired concentration and with a degree of insoluble matter allowed according to application or in powder form, which facilitates and cuts costs of transport and storage;

the water reducers, fluidizers, dispersants, tensio-actives and agglutinants (solution or powder) obtained according to the process of the invention show a high homogeneity due to the fact that the raw material is always the same or very similar which facilitates industrial usage since it makes it easier to prepare formulations as required.

EXAMPLES

Some examples of dispersant, tensio-active, agglutinant and adhesive agents obtained according to the above process during development and research are outlined below:

Example A

The production process and the related research were carried out at a distillery, which produces ethanol from sugar mill molasses. Distillery production was 30,000 liters of ethanol a day and an effluent production of 15,000 per hour with a 91.5% water content weight, 7% of polymeric complex and 1.5% of insoluble matter which mainly comprises calcium sulphate and an distillation tower outlet temperature of 80%.

Precipitates were separated through centrifugation at a nozzle centrifuge.

A four-chamber concentrator comprised of descending columns and a snap or abrupt expansion chamber was used.

The steam entering the first descending column chamber was at 120° C. and condensates at the fourth chamber outlet were at 75° C. The abrupt expansion effect was provided by way of a separate circuit using the same steam.

A polymeric complex was produced at the concentration installation outlet with a 44% weight concentration, a 10% insoluble matter and water at a rate of 44%, a temperature of 82° C. and a volume of flow of 2,145 liters/hour.

The concentrated effluent contained gels and was settled by gravity over five days and a polymeric complex was obtained having an insoluble matter percentage of less than 2.5. The polymeric complex was sold to industry.

Example B

This process took place in an ethanol-producing distillery using molasses from sugar factories, which produces 50,000 liters/day of alcohol and 25,000 liters/hour of effluent, where the effluent was concentrated in a Concentration Plant which comprises a four descending chambers and two abrupt expansion chambers. Effluent entering the concentrator had an 8% polymeric complex concentration, a 1% insoluble matter content and 91% water content.

The pressure of the steam supply to the concentration device was regulated and water at 80° C. was added which decreased steam supply temperature to 92° C.

Insoluble matter at the concentrator outlet was 6%, consisting of being polymeric complex concentration about 50% and water concentration about 44%.

The polymeric complex, which contained no gels, was settled over five days and the insoluble matter concentration was less than 1.5%.

This trial showed that the steam supply temperature regulate both gels and insoluble content since from a certain value it precipitated calcium sulphate, which remained in a dissolved state.

Several tests were carried out and it was verified that the best operating point having the least insoluble matter precipitation was at a heating fluid temperature for vaporization below 84° C.

Example C

At the same distillery a centrifuging clearing plant was used between the outlet of first abrupt expansion effect and second-effect or outlet-effect. The polymeric complex was centrifuged and the percentage of insoluble matter was determined.

It was less than 0.1% at the centrifugal machine outlet. The effluent was heated at 60° C. before introducing it to the second abrupt expansion effect, concentration ended and a 0.2% level of insoluble matter was obtained from the concentrated effluent or polymeric complex but after a 24 hour settling period this insoluble matter increased to a level of 0.6%. This test showed that a 24-hour settling period is necessary before centrifuging the polymeric complex in order to obtain the whole insoluble matter therein.

Example D

At the same distillery the same test was repeated but leaving the polymeric complex, which was produced from the first abrupt expansion effect at a 40% concentration, to settle for a 24-hour period. This product was then centrifuged to obtain 0.1% of insoluble matter, heated at 60□0□C and the final concentration was carried out at the second effect outlet.

The amount of 0.15% of insoluble matter was obtained at the second effect outlet and after a 24 hour period the insoluble content rose to 0.3% and stayed at this level.

Example E

It was noted at the same distillery that upon repeating the tests from Example D and after analyzing the insoluble matter, a layer of gelled (in the shape of gel) polymeric complex appeared at the bottom of the test tube at a rate of 1% and a second layer from this complex as colloid at a rate of 2%.

Suitable enzymes were added to the concentrated polymeric complex at the outlet of the first abrupt expansion effect and also the to settling tank before centrifuging at a rate of 50 PPM. This composition was centrifuged and concentration ended. It was shown after analyzing, that the colloids and gels disappeared and the tests on the effectiveness of the polymer complex demonstrated that its effectiveness as dispersant, tensio-active, agluttinant or adhesive did not decrease.

Example F

The test from Example F was repeated with the aim of changing the dominant cation in the polymeric complex, which was calcium at a rate of 3%. A sodium based chemical compound was added in a controlled manner at the first abrupt expansion effect site. The pH of the complex increased also in a controlled manner and the sodium cation became dominant at a valve of 2.8%; calcium cation decreased to a value of 1%.

It was noted that the gels and colloids disappeared when the pH increased to a value of 9.

Example G

The polymeric complex from the above Example D was dried in a Drying Plant using a spray dryer at a production rate of 1,000 kg/hour. A powder, which displayed a residual humidity of 3.5%, was obtained.

This product was packed into three-ply paper bags, wherein one of them was polyvinyl-covered. After a month, it retained its residual humidity and maintained its characteristics as when packed.

The powder was water-dissolved to obtain the same concentration as before drying and the polymer solution thus obtained integrally reproduced all the characteristics it displayed when dried.

What is claimed is:

1. A process for obtaining a polymeric complex from a by-product effluent obtained in a process for manufacturing alcohol by distilling a fermented aqueous sugar solution containing yeast, comprising the steps of:
    obtaining the effluent comprising a fermented sugar solution containing yeast after distilling alcohol therefrom;
    adding to said effluent a flocculant selected from the group consisting of chemical flocculants, biological flocculants and mixtures thereof, and forming a homogeneous mixture of said flocculant and said effluent;
    heating said homogeneous mixture to a temperature of at least about 80° C.;
    removing yeast from the heated mixture by a first decantation;
    mixing the heated mixture from which yeast has been removed, and removing therefrom insoluble solids and muds by a second decantation; and
    concentrating the mixture after said second decantation by partially evaporating water therefrom to obtain an aqueous solution of the polymeric complex.

2. A process according to claim 1, additionally comprising treating the insoluble solids and muds removed from the heated mixture with a flocculant selected from the group consisting of chemical flocculants, biological flocculants and mixtures thereof, to produce a material useful as a fertilizer, a substratum for biotechnology or a product for use in manufacturing fertilizer.

3. A process according to claim 1, wherein a flocculant is not used in said first or second decantation.

4. A process according to claim 1, wherein said effluent comprises, by weight, about 4 to 16% of polymeric complex, about 1 to 4% insoluble solids and muds, and about 84 to 95% water.

5. A process according to claim 1, wherein said evaporation is carried out maintaining the polymeric complex in a liquid suspension at a temperature not greater than 92° C.

6. A process according to claim 1, wherein said evaporation is carried out at a temperature greater than 92° C. to obtain the polymeric complex in gel form.

7. A process according to claim 1, wherein said evaporation is carried out at a negative pressure of up to about $9 \times 10^4$ Pascal.

8. A process according to claim 1, wherein the aqueous solution of the polymeric complex comprises, by weight, about 45–55% of said complex, about 35–45% of water, and not more than 10% of precipitates.

9. A process according to claim 1, additionally comprising at least one step selected from the group consisting of settling and centrifugation for separation of liquid and solids.

10. A process according to claim 9, wherein the aqueous solution of the polymeric complex comprises about 0.5 to 10% by weight of solid matter.

11. A process according to claim 1, additionally comprising a step of drying the aqueous solution of the polymeric complex to obtain a powdered product with a residual moisture content of less than about 7% by weight.

12. A process according to claim 1, wherein said aqueous solution of the polymeric complex has a pH between about 4 and 11.

13. A process according to claim 1, additionally comprising adding an enzyme to said mixture prior to said second decantation to eliminate gelling of the polymeric complex and improve fertilizer properties thereof.

14. A process according to claim 1, additionally comprising adding to said polymeric complex at least one cation selected from the group consisting of potassium, sodium, ammonium, calcium, magnesium, aluminum, phosphorus, boron, manganese and molybdenum.

* * * * *